(12) United States Patent
Graham (10) Patent No.: US 9,244,501 B2
(45) Date of Patent: *Jan. 26, 2016

(54) DOCKING STATIONS FOR REMOTE CONTROL AND MULTIMEDIA DEVICES

(71) Applicant: Universal Remote Technologies, LLC, Atlanta, GA (US)

(72) Inventor: Tarah Graham, Atlanta, GA (US)

(73) Assignee: Universal Remote Technologies, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,027

(22) Filed: Sep. 30, 2014

(65) Prior Publication Data

US 2015/0134869 A1 May 14, 2015

Related U.S. Application Data

(63) Continuation of application No. 12/569,657, filed on Sep. 29, 2009, now Pat. No. 8,847,549.

(51) Int. Cl.
*H02J 7/00* (2006.01)
*G06F 1/16* (2006.01)
*G06F 13/40* (2006.01)

(52) U.S. Cl.
CPC ............ *G06F 1/1698* (2013.01); *G06F 1/1632* (2013.01); *G06F 13/4081* (2013.01); *H02J 7/0044* (2013.01); *H02J 7/0027* (2013.01)

(58) Field of Classification Search
CPC ...................................... H02J 7/0044
USPC ............. 320/115, 114, 107; 310/50; 710/303, 710/304; 455/573, 550.1; 342/23
See application file for complete search history.

(56) References Cited

U.S. PATENT DOCUMENTS

| | | | |
|---|---|---|---|
| 6,489,746 B1 * | 12/2002 | Pettinato | 320/111 |
| 2007/0086724 A1 * | 4/2007 | Grady et al. | 386/46 |
| 2007/0247794 A1 * | 10/2007 | Jaffe et al. | 361/681 |
| 2009/0164688 A1 * | 6/2009 | Wright-Riley | 710/303 |

* cited by examiner

*Primary Examiner* — Yalkew Fantu
(74) *Attorney, Agent, or Firm* — Next IP Law Group LLP; Minh N. Nguyen, Esq.

(57) ABSTRACT

A representative base unit for charging a remote controller and a multimedia device includes at least two docking stations for a remote controller and a multimedia device, wherein the at least two docking stations having charging slots that transfer power to the remote controller and the multimedia device for recharging; and a processing device that is electrically coupled to the docking stations for communicating with the remote controller and the multimedia device, wherein the processing device facilitates communication between the remote controller and the multimedia device.

21 Claims, 6 Drawing Sheets

DOCKING STATIONS FOR REMOTE CONTROL AND MULTIMEDIA DEVICES

CROSS-REFERENCE TO RELATED APPLICATIONS

This application is a continuation of U.S. utility application entitled, "DOCKING STATIONS FOR REMOTE CONTROL AND MULTIMEDIA DEVICES," having Ser. No. 12/569,657, filed on Sep. 29, 2009, which claims the benefit of U.S. provisional application having Ser. No. 61/101,296, filed on Sep. 30, 2008, all of which are entirely incorporated herein by reference.

TECHNICAL FIELD

The present disclosure relates to universal remote control systems, and more particularly pertains to a universal remote control system for providing a multi-function multipurpose remote control with a base charger.

BACKGROUND

Many remote control systems may be used to issue commands, from a distance, to televisions and other consumer electronic devices. Existing remote controls may be charged by small AAA and AA batteries, but such battery operated remote controls typically use disposable batteries that are replaced when batteries are discharged. In addition, the remote control may be placed where the user cannot find it, which can be very frustrating. Thus, a need exists to address this and other deficiencies.

SUMMARY

A representative base unit for charging a remote controller and a multimedia device includes at least two docking stations for a remote controller and a multimedia device, wherein the at least two docking stations having charging slots that transfer power to the remote controller and the multimedia device for recharging; and a processing device that is electrically coupled to the docking stations for communicating with the remote controller and the multimedia device, wherein the processing device facilitates communication between the remote controller and the multimedia device.

Other systems, methods, features, and/or advantages of this disclosure will be or may become apparent to one with skill in the art upon examination of the following drawings and detailed description. It is intended that all such additional systems, methods, features, and advantages be included within this description and be within the scope of the present disclosure.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, the reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Exemplary systems are first discussed with reference to the figures. Although these systems are described in detail, they are provided for purposes of illustration only and various modifications are feasible.

Figure 1:
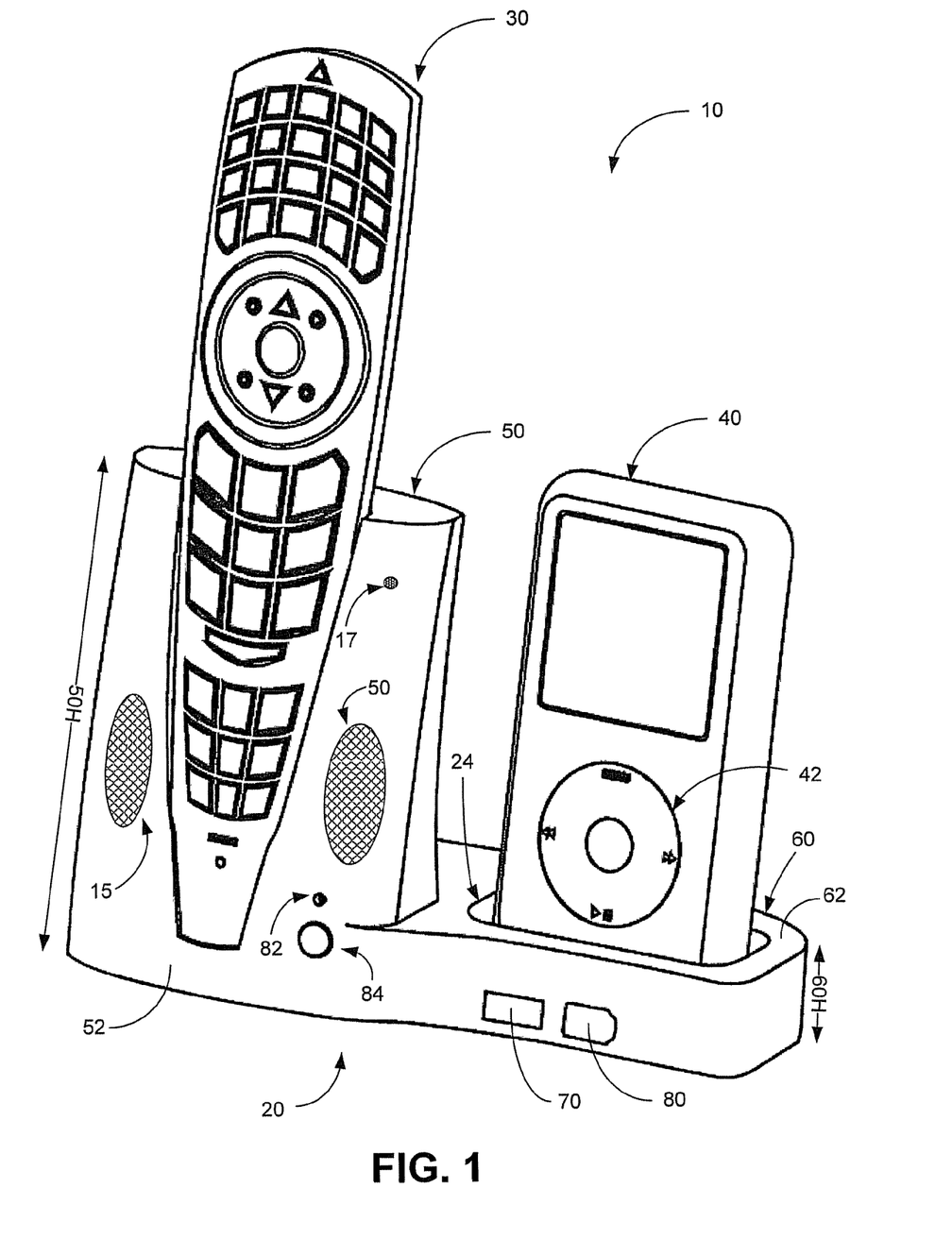
FIG. 1 is a perspective view of a rechargeable universal remote control system for a remote controller and a multimedia device, such as, an iPod and/or MP3 and MP4 player.

FIG. 1 is a perspective view of a rechargeable universal remote control system 10 for a remote controller 30 and a multimedia device 40, such as, an iPod, iPhone and/or MP3 and MP4 player. The rechargeable universal remote control system 10 comprises a base unit 20 having docking stations 22 (FIG. 2), 24 for a remote controller 30 and the multimedia device 40.

The remote controller 30 and multimedia device 40 may be positioned on the base unit 20 such that the remote controller 30 and multimedia device 40 may operationally engage docking stations 22, 24 of the docking platforms 50, 60, respectively, for recharging. Thus, the base unit 20 may charge the battery of the remote controller 30 and multimedia device 40. Other base units have been disclosed such as U.S. Pat. No. 6,879,254, to Tarah N. Graham, which is incorporated by reference herein in its entirety.

Alternatively or additionally, the base unit 20 can include speakers 15 and microphones 17 that are electrically coupled to the multimedia device 40 for playing and receiving audio signals. For example, an audio player, such as an iPod or iPhone, can play stored audio signals through the speakers 15 of the base unit 20. In another example, the base unit 20 having speakers 15 and microphones 17 can be use as a speakerphone during a telephone call of the iPhone or any other smartphones. The user can press the button 84 to answer an incoming telephone call and begin speaking through microphones 17.

A controller docking platform 50 of the base unit 20 includes a height 50H that is approximately ½ of the height of the remote controller 30. A multimedia device docking platform 60 of the base unit 20 is integrally connected to the base 52 of the controller docking platform 50 and extends horizontally to the right side of the controller docking platform 50. The multimedia device docking platform 60 includes a height 60H that is approximately the ¼ of the height of the controller docking platform 50. The docking station 24 can hold the multimedia device 40 such that a user controller 42 of the multimedia device 40 is above the top surface 62 of the multimedia device docking platform 60.

Both docking platforms 50, 60 hold the remote controller 30 and multimedia device 40, respectively, in an upright position within the docking stations 22, 24, respectively. The docking stations 22, 24 include charging ports (not shown) that provide power to the remote controller 30 and multimedia device 40 for recharging. The charging port of the docking stations 24 can also be used as a media interface that facilitates communication between the multimedia device, the base unit 20, and the remote controller 30. The base unit 20 further includes multimedia ports, such as, a Firewire™ port 80 and a universal serial bus (USB) port 70, that facilitates electrical connection between the multimedia device 40 and other multimedia devices (not shown) using the ports 70, 80. The ports 70, 80 allow the base unit 20 to be able to communicate with the other multimedia devices and download files (data, music, etc.) to the multimedia device 40 or the remote controller 30. A charging indicator light 82 is position in front of the base unit to illuminate either a green light or red light when the remote controller 30 and/or multimedia device 40 are or are not recharging, respectively. A paging controller button 84 pages the remote controller 30 so that the remote controller 30 can respond with a flashing and/or illuminating light or make a sound to allow the user to find the remote controller 30.

Figure 2:
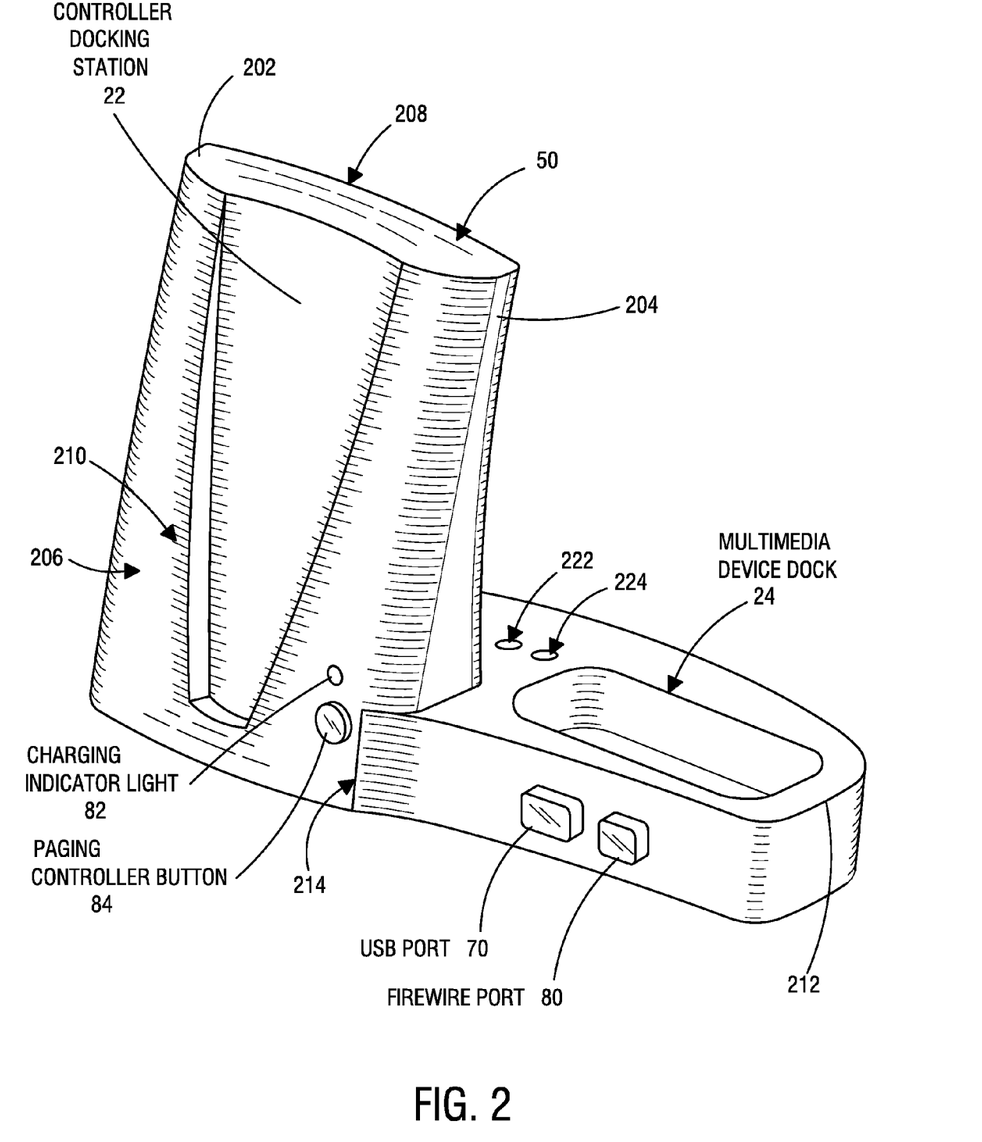
FIG. 2 is a perspective view of a base unit, such as that shown in FIG. 1.

FIG. 2 is a perspective view of a base unit 20, such as that shown in FIG. 1. The front section 206 of the controller docking platform 50 has a generally rectangular shape and includes the docking station 22 positioned in the middle of the front section 206. The controller docking station 22 is a depression that is generally shaped in a letter V and conforms to the middle and lower portion of the remote controller 30. The back portion of the base unit 20 includes a power port 222 that electrically couples to a power source (not shown) to provide power to the base unit 20. The back portion of the base unit 20 further includes a stereo jack 224 that electrically couples the multimedia device 40 to an external speaker (e.g., home entertainment speaker system) for playing audio signals. The external speaker can be used to play audio signals of a song or a telephone call from the multimedia device 40.

The front section 206 and back section 208 of the controller docking station 22 converges toward the side ends 202, 204 of the controller docking platform 60. Each side end 202, 204 is flat and has a generally triangular shape. The top width of the side ends 202, 204 is smaller than the bottom width of the side ends 202, 204 of the controller docking platform 60

The multimedia device docking platform 60 is integrally connected to the lower portion at the right side and back side of the controller docking platform 50. The left end 210 of the multimedia device docking platform 60 are integrally connected to the lower portion left side end 202 of the controller docking platform 50. The back section of the multimedia device docking station 24 extends and curves away from the controller docking platform 50 beginning at the left end 210 of the multimedia device docking platform 60 and towards the flat right end 212 of the multimedia device docking station 24. The front section of the multimedia device docking platform 60 curves toward the multimedia device docking station 24 beginning at the front right side 214 of the multimedia device docking platform 60 and ends at the flat right end 212. The multimedia device docking station 24 of the multimedia device docking platform 60 is generally in a shape of a rectangle and conforms to the lower portion of the multimedia device 40.

Figure 3:
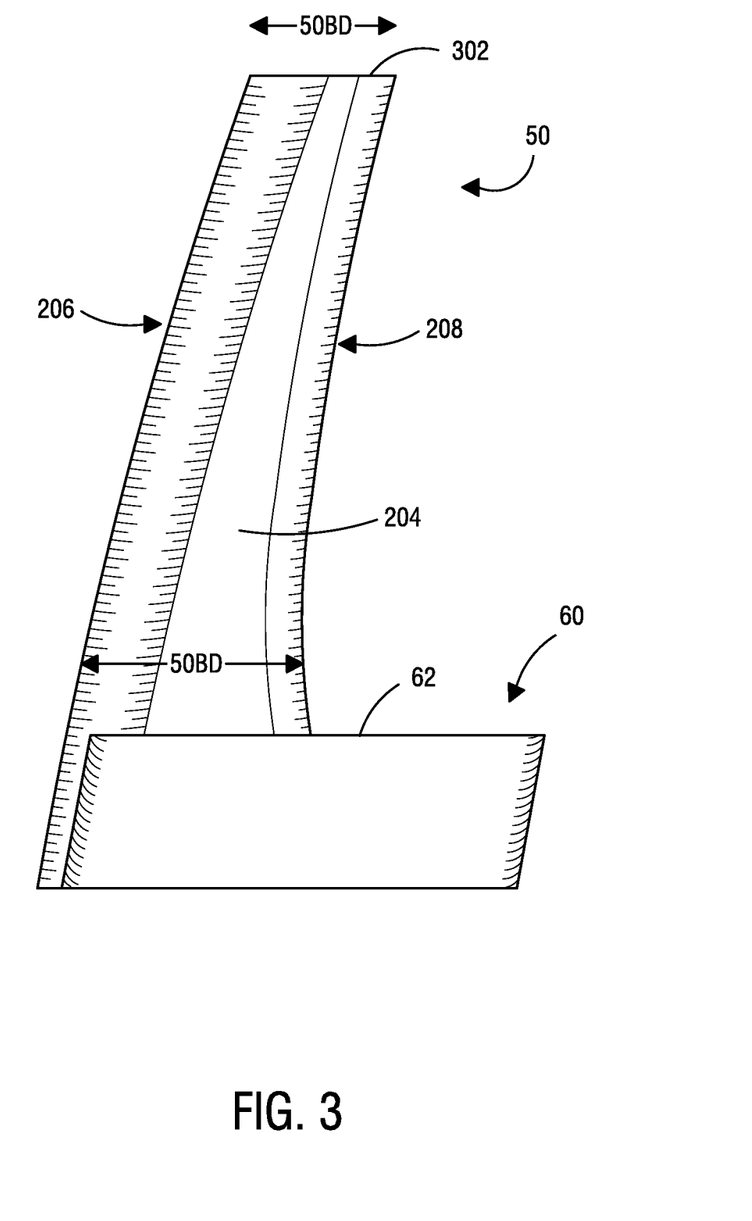
FIG. 3 is a right side view of a base unit, such as that shown in FIG. 1.

FIG. 3 is a right side view of a base unit 20, such as that shown in FIG. 1. As shown in FIG. 3, both the controller and multimedia device docking platforms 50, 60 tilt right from bottom to top. The front section 206 of the controller docking platform 50 further includes a slight curve from the front bottom to the front top. The back section 208 curves toward the front section 206 beginning at the top surface 62 of the multimedia device docking platform 60 and ending at the top surface of the controller docking platform 50.

Figure 4:
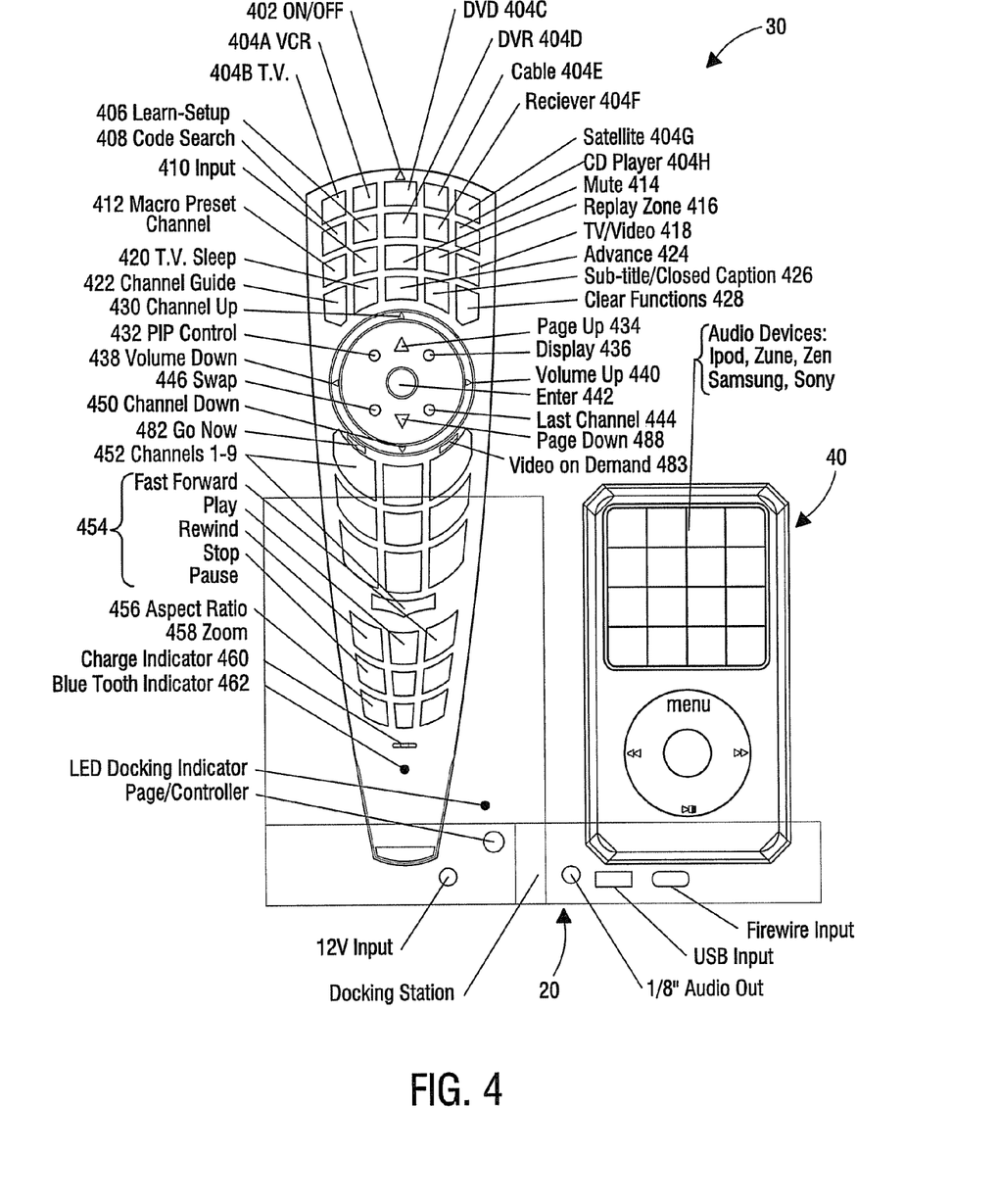
FIG. 4 is a front view of a base unit, such as that shown in FIG. 1 and illustrates the various functions of the buttons on the remote controller.

FIG. 4 is a front view of a base unit 20, such as that shown in FIG. 1 and illustrates the various functions of the buttons on the remote controller 30. The list of functions are as follows:

Power button 402: Turns product on and off (controls power on #2)

Buttons 404A-H to control selected devices, such as, VCR, TV, DVD, DVR, Cable, AUDIO Receiver, Satellite, and, CD, multimedia device, Xbox, playstation, WII Learn button 406: Used to setup learning functions (learn other remotes)

Code Search 408: Used for setup (search code for #2)

Input 410: Brings up the DVD Players Setup Menu

Marco Preset Channel 412: Works with digits (1-9) to program and store up to 9 button-presses of your choice Mute 414: Turns off the TV sound while the picture is remains TV listing find 416: Replay Zones—searches TV listing by category (DVR function)

Component Change 418: Change viewing setting on the TV such as video 1, video 2, DVD, sat, etc TV sleep 420: Turns off the TV after a period of 1 to 99 minutes Channel Guide 422: Guide menu (cable, sat, dvr, etc. . . . )

Instant Playback 424: Catches you up with live broadcast (DVR function)

Sub title/Closed Caption 426: TV closed Caption (if your TV has this feature) or DVD subtitle toggle Clear Functions 428: Used to exit menu Channel Up 430: Changes the channels up PIP control 432: TV picture-in-picture control Page UP 434: scrolls thru the entire page up (instead of channel by channel/used in guide menu—on cable & satellite)

Display 436: Displays/selects on-screen channel information, etc

Volume Down 438: volume turned down . . . controls DVD/CD/IPOD/MULTIMEDIA (MP3/MP4/ETC) track selections—DVD/CD/IPOD/MULTIMEDIA (MP3/MP4/ETC) track skips up/down (in DVD and Sat modes)

Volume UP 440: volume turned up . . . controls DVD/CD/IPOD/MULTIMEDIA (MP3/MP4/ETC) track selections—DVD/CD/IPOD/MULTIMEDIA (MP3/MP4/ETC) track skips up/down (in DVD and Sat modes)

Enter 442: execution button, used to select

Last Channel 444: switches channels on TV to the last/previous channel

Swap 446: Swaps TV PIP screens

Page Down 448: scrolls thru the entire page down (instead of channel by channel/used in guide menu—on cable & satellite)

Channel Down 450: Changes the channels down

Channels 452: Enter numbers for direct channel selection. Some products require enter to be pressed after channel selection DVD/VCR/IPOD/MULTIMEDIA (MP3/MP4/ETC) Functions 454: fast forward (2× & above), rewind, pause, play, stop Aspect Ratio 456: Change between viewing ratios Picture Zoom 458: Zoom picture DVD Menu: Takes you to the DVD menu Charge/Power indicator 460: shows that the remote controller is charging and how much power/battery life is remaining on remote Go Now-access 482 to the internet and weather features On Demand-Video on demand 483 (offer by cable companies)

Blue Tooth Enable/button and Indicator 462: shows when Blue tooth is connected. It syncs to other blue tooth compatible products when the button is pressed DVR/VCR Record button (not shown): Record onto the DVR or VCR The remote control 30 can communicate with the multimedia device 40 using infrared, radio frequency (RF) and Bluetooth technology. At least one of the infrared, radio frequency (RF) and Bluetooth technology can be implemented into the base unit 20. The infrared sensor can be located on the front-bottom-center of the base unit 20. The remote controller 30 can connect automatically via Bluetooth when placed on its base unit 20. Then once the two device (e.g., remote controller 30 and multimedia device 40) synchronizes, the Bluetooth light can begin blinking/illuminating. Once the synchronicity has completed, the two device (e.g., remote controller 30 and multimedia device 40) can communicate between each other. All the information from the multimedia device 40 can appear on a display (not shown) of the remote controller 30. The infrared sensor or Radio frequency (RF) signals, can enable the user to control the actual multimedia device 40, such as, play, rewind, fast forward, pause, shuffle and stop. The base unit 20 can be compatible for various MP3 players, such as, Apple IPOD/MULTIMEDIA (MP3/MP4/etc), Creative Zen, Microsoft Zune, Samsung, YP-P2, SanDisk Sansa, Sony, COBY MP and more.

The following is a description of the operation between the remote controller 30/multimedia device 40 and the base unit 20. The remote control 30 charges while on docking station and lighting features remain off until a remote's button is motioned. The multimedia device 40 operates as disclosed in its owner's manual. Then once the multimedia device 40 is placed on the multimedia device docking station 24 the multimedia device 40 starts to synchronize via Bluetooth with the remote controller 40. The multimedia device 40 also charges via the media interface at the multimedia device docking station 24.

Bluetooth can be built into the base unit 20. The remote controller 30 communicates with the base unit 20. The information is then relayed to the multimedia device 40 via the media interface. When the multimedia device 40 has completed its synchronization with the remote controller 30, the Bluetooth light can then be constant and cease blinking. If the Bluetooth does not synchronize properly, hold and press the remote control's Bluetooth button for 5 seconds and point it directly at the infrared sensor square located on the base unit. Next, release the button and when the Bluetooth light cease blinking, it has synchronized with the remote controller 30. With Bluetooth implemented in the remote controller 30, the remote controller 30 can control car stereos or any devices that uses Bluetooth.

The multimedia device 40 sends information to the remote controller 30 via the media interface and the Bluetooth. Bluetooth then transmits the data from multimedia device 40 to the display of the remote controller 30. The display can display information being received from the multimedia device 40.

Once the multimedia device 40 and remote controller 30 have completed synchronizing and the Bluetooth light is constantly lit, the remote controller 30 can be used to control the multimedia device 40. The remote controller 30 and IPOD multimedia device 40 can automatically synchronize.

The remote controller 30 can control the multimedia device 40 responsive to pressing an MP3 button on the remote controller 30. Once MP3 button is pressed, information can start to transmit from the multimedia device 40 to the display of the remote controller 30. A user can use the control buttons on the remote controller 30 to control multimedia device 40.

A user can view the playlist on the display of the remote controller 30. Since the remote controller 30 can control the multimedia device 40 via the base unit 20, the display on the remote controller 30 can display other information related to the audio signals, such as, title, artist, and genre of the audio song, among others.

The following is a description of the features of the base unit 20. The base unit 20 can include the following components: 1) Bluetooth, 2) Infrared, 3) Speaker port, 4) USB port, 5) media interface for MP3 player, 6) Infrared sensor, 7) Power outlet, 8) Fire wire port, 9) Control Docking Station, 10) Charging light indicator, 11) Paging control button, and 12) multimedia device docking station. The base unit 20 includes a circuit board that electrically connects to the remote controller 30 via wires and/or Bluetooth. The base unit 20 is one unit with two docking stations 22, 24; one for the remote controller 30 and the other for multimedia device 40. Both the remote controller 30 and base unit 20 can be fitted with removable face plate that customized or personalized to the liking of the user.

The following is a description of the features of multimedia device 40. The multimedia device 40 operates as usual respective to its owner's manual. The base unit 20 and remote controller 30 communicate between each other, transmitting signals to the multimedia device 40 via the infrared, radio frequency (RF) and Bluetooth technology.

Figure 5:
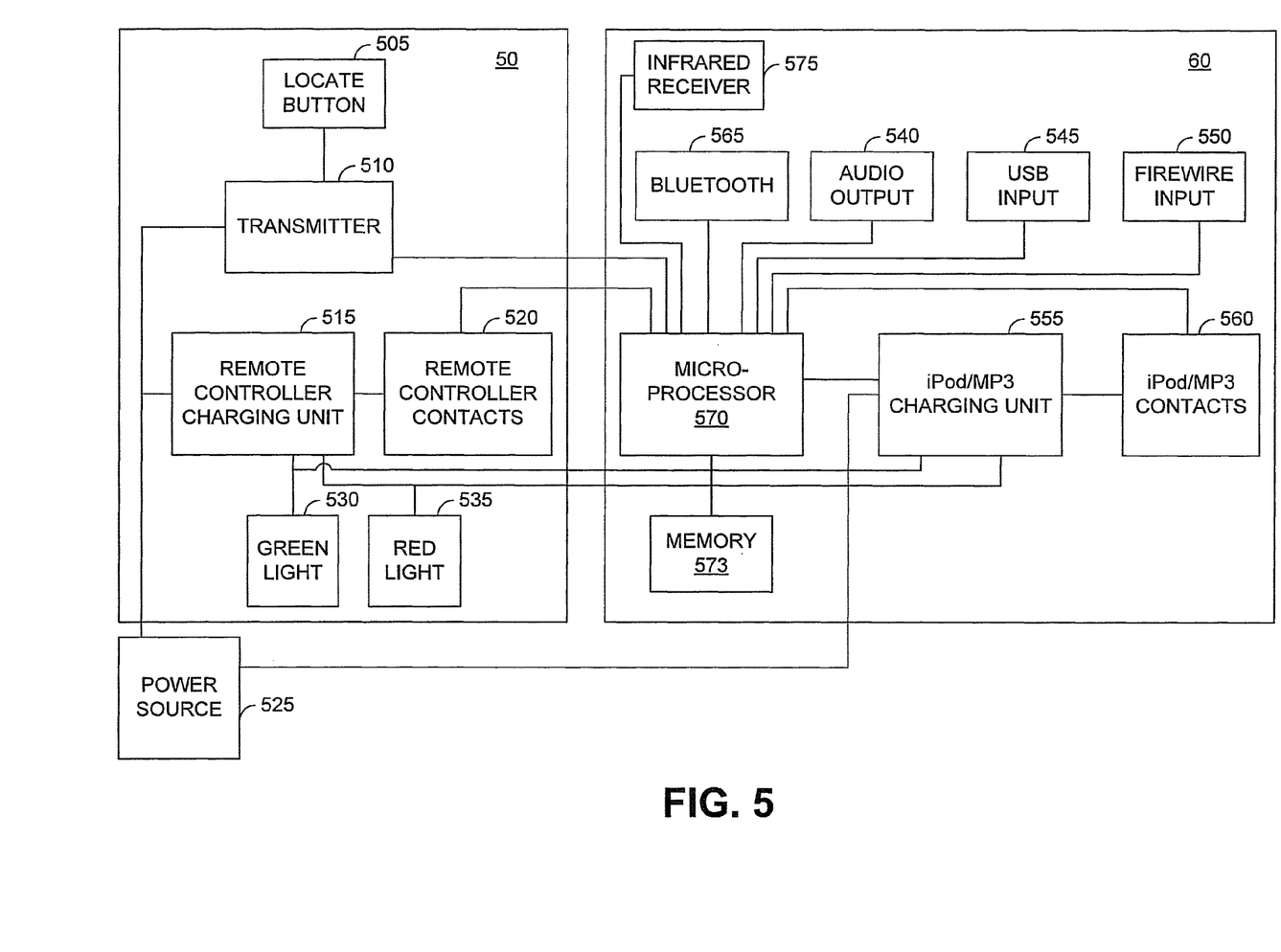
FIG. 5 is a schematic diagram of a base unit, such as that shown in FIG. 1.

FIG. 5 is a schematic diagram of a base unit 20, such as that shown in FIG. 1. The controller docking platform 50 includes a locate button 505 that a user can push to instruct the base unit 10 to locate the remote controller 30. The locate button sends a signal to a transmitter 510 instructing the transmitter 510 to transmit a locate signal to the remote controller 30. The locate signal can be generated by a microprocessor 570 and transmitted to the transmitter 510. The remote controller 30 receives the locate signal and, for example, flashes light from an LED or makes a sound (e.g., beeps or plays music) to aid the user in locating the remote controller 30.

The controller docking platform 50 further includes contacts 520 for electrically coupling the remote controller 30 with a charging unit 515, which facilitates charging the batteries of the remote controller 30. The green and right lights 530, 535 are connected to the charging unit 515 that illuminates the lights 530, 535 to indicate that the batteries are fully charges or the batteries have insufficient power, respectively.

The remote controller 30 can communicate with the microprocessor 570 via the contacts 520 to gather and process information related to the remote controller 30. Similarly, the multimedia device 40 can communicate with the microprocessor 570 via contacts 560 to gather and process information related to the multimedia device 40. For example, the remote controller 30 can be synchronized with the multimedia device 40 when the remote controller 30 and the multimedia device 40 are docking on the base unit 10. The microprocessor 570 receives information from both the remote controller 30 and the multimedia device 40 via the contacts 520, 560. After synchronization is completed, the remote controller 30 can control the multimedia device 40 using a Bluetooth module 565 and/or an infrared receiver 575.

The infrared receiver 575, a Bluetooth module 565, and RF receiver (not shown) can receive instruction signals from the remote controller 30 and facilitate controlling the multimedia device 40 on the base unit 10. The infrared receiver 575 transmits the received instruction signals to the microprocessor 570, which processes the instruction signals and instructs the multimedia device 40 based on the instruction signals. The microprocessor 570 is electrically coupled to audio output 540, USB input 545 and Firewire input 550, which connects the multimedia device 40 to audio receivers/speakers and devices that can communicate via USB and Firewire.

The multimedia device 40 can electrically couple to a charging unit 555 via the contacts 560. The charging unit 555 facilitates charging the batteries of the multimedia device 40. The green and red lights 530, 535 are connected to the charging unit 555 that illuminates the lights 530, 535 to indicate that the batteries are fully charges or the batteries have insufficient power, respectively.

Figure 6:
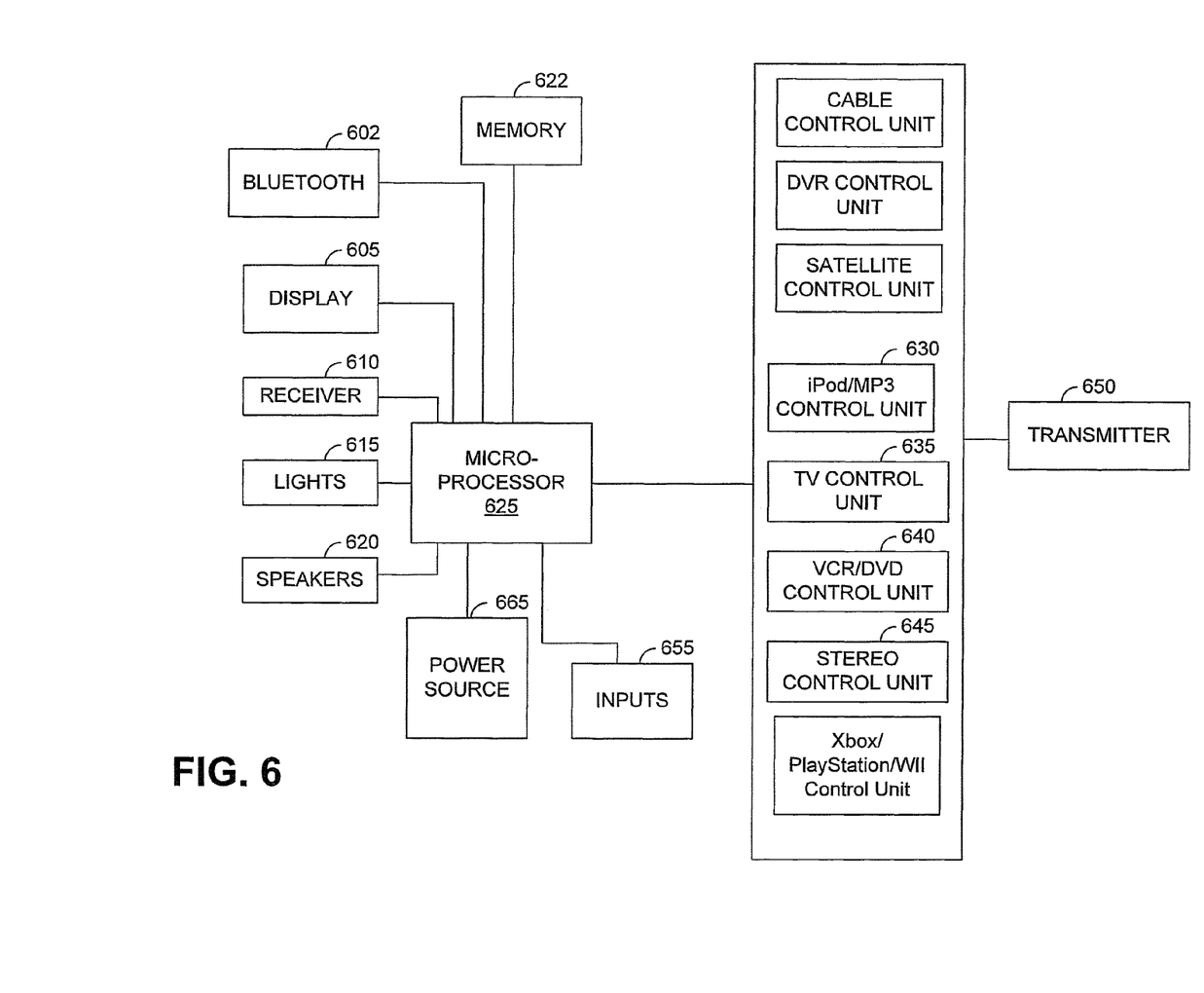
FIG. 6 is a schematic diagram of a remote controller, such as that shown in FIG. 1.

FIG. 6 is a schematic diagram of a remote controller 30, such as that shown in FIG. 1. A receiver 610 is positioned in the remote controller 30 for receiving the locate signal from the transmitter 510 of the base unit 10. A microprocessor 625 is positioned in the remote controller 30. The receiver 610 is operationally coupled to the microprocessor 625. A speaker 620 is operationally coupled to the microprocessor 625 for producing an audio signal from the remote controller 30 when the receiver 610 receives the locate signal from the transmitter 510, mentioned above.

A light source 615 is operationally coupled to the microprocessor 625 for illuminating when the receiver 610 receives the locate signal from the transmitter 510. The remote control 30 can include a light source 615. The microprocessor 625 is further coupled to inputs 655, such as operational buttons that were described in FIG. 4. The operational keys can be configured into groups for controlling particular devices including TV, cable VCR, DVD, stereo and video receivers, satellite receivers, and audio equipment, playstation, xbox, or alike. Based on the inputs, the microprocessor 625 determines which particular control units 630, 635, 640, 645 to use to control a particular device. Responsive to determining the control unit 630, 635, 640, 645 to use, the microprocessor 625 communicates with the determined control unit 630, 635, 640, 645, instructing the control unit 630, 635, 640, 645 to transmit control signals to the particular device using an infrared transmitter 650 based on the input 655. The remote controller 30 includes memory 622, which can store music or various sounds that can be used to locate the remote controller. The memory 622 can further store synchronized information associated with the multimedia device 40.

Alternatively or additional, the remote control 30 can communicate wirelessly with home electronic devices other than televisions and DVD/CD players that were previously mentioned, such as, appliances, lighting, garage door system, security system, and HVAC systems, among others. The remote control 30 can be implemented with Z-Wave® technology, created by Zensys, Inc. It should be noted that the microprocessors 570, 625 can include any custom made or commercially available processor, a central processing unit (CPU) or an auxiliary processor among several processors, a semiconductor based microprocessor (in the form of a microchip), or a macroprocessor.

The memory 622, 573 can include any one or a combination of volatile memory elements (e.g., random access memory (RAM, such as DRAM, SRAM, etc.)) and nonvolatile memory elements (e.g., ROM, etc.). The memory 622, 573 normally comprises various programs (in software and/or firmware) including an operating system (O/S). The O/S controls the execution of programs, and provides scheduling, input-output control, file and data management, memory management, and communication control and related services.

The systems and methods disclosed herein can be implemented in software, hardware, or a combination thereof. In some embodiments, the system and/or method is implemented in software that is stored in a memory and that is executed by a suitable microprocessor (µP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example, but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Therefore, having thus described the disclosure, at least the following is claimed:

1. A remote control system comprising:
   a universal remote controller having a receiver and a display device, and
   a base unit for establishing wireless communication between the universal remote controller and a multimedia device, the base unit including:
      at least two docking stations for docking the universal remote controller and a multimedia device,
      a processing device that is electrically coupled to the universal remote controller and the multimedia device, wherein the processing device receives media data from the multimedia device, and
      a transmitter that receives the media data from the processing device and wirelessly transmits media data from the multimedia device to the receiver of the universal remote controller which in turn displays the media data on the display device of the remote controller.

2. The remote control system as defined in claim 1, wherein the universal remote controller having a wireless communications system that facilitates establishing wireless communication between the remote controller and the multimedia device.

3. The remote control system as defined in claim 1, wherein the base unit having a wireless communications system that facilitates establishing wireless communication between the remote controller and the multimedia device.

4. The remote control system as defined in claim 1, wherein the at least two docking stations having charging slots that transfer power to the universal remote controller and the multimedia device for recharging.

5. The remote control system as defined in claim 1, wherein the base unit comprising a stereo jack that electrically couples the multimedia device to a speaker for playing audio signals.

6. The remote control system as defined in claim 1, wherein the base unit comprising a multimedia port that facilitates electrical connection between the multimedia device and the other multimedia devices, wherein the multimedia port facilitates communication between the multimedia device and the other multimedia devices.

7. The remote control system as defined in claim 6, wherein the multimedia port facilitates electrical connection between a speaker and the multimedia device.

8. The remote control system as defined in claim 1, wherein the base unit comprising adaptors that engages the docking station for the multimedia device, wherein the adaptors allows various sizes of other multimedia devices to fit in the multimedia docking station.

9. The remote control system as defined in claim 1, wherein the remote controller controls the multimedia device through the base unit to operate the various features of the multimedia device.

10. The remote control system as defined in claim 1, wherein the base unit comprising a speaker that receives audio signals from the multimedia device.

11. The remote control system as defined in claim 1, wherein the base unit comprising a microphone that sends audio signals to the multimedia device.

12. The remote control system as defined in claim 1, wherein the wireless communications systems includes Bluetooth technology that enables the base unit to communicate with any Bluetooth-capable devices.

13. The remote control system as defined in claim 12, wherein the base unit comprising data storage that stores digital data from the Bluetooth-capable devices.

14. The remote control system as defined in claim 13, wherein the base unit comprising data storage that stores digital data from the multimedia device.

15. The remote control system as defined in claim 1, wherein the base unit comprising a USB port that facilitates transferring digital data from the base unit to data storage devices, wherein the data storage devices include SD memory card, mirco SD memory card, mini SD memory card, compact flash card, xD SD memory card, and Sony SD memory card.

16. The remote control system as defined in claim 1, further comprising interchangeable face plates that covers the front surface of the base unit or the remote controller.

17. The remote control system as defined in claim 1, wherein the remote controller includes a display that displays at least a portion of digital data from the multimedia device.

18. A base unit for establishing wireless communication between a universal remote controller and a multimedia device, the base unit comprising:
   at least two docking stations for docking the universal remote controller and a multimedia device;
   a processing device that is electrically coupled to the universal remote controller and the multimedia device, wherein the processing device receives media data from the multimedia device; and
   a transmitter that receives the media data from the processing device and wirelessly transmits media data from the multimedia device to a receiver of the universal remote controller which in turn displays the media data on a display device of the remote controller.

19. The base unit as defined in claim 18, wherein the universal remote controller having a wireless communications system that facilitates establishing wireless communication between the remote controller and the multimedia device.

20. The base unit as defined in claim 18, further comprising a wireless communications system that facilitates establishing wireless communication between the remote controller and the multimedia device.

21. The base unit as defined in claim 18, wherein the at least two docking stations having charging slots that transfer power to the universal remote controller and the multimedia device for recharging.

* * * * *